Sept. 4, 1923.

C. H. BOYULS 1,466,693

IRONING MACHINE

Filed Feb. 13, 1922

Sept. 4, 1923.                                        1,466,693
C. H. BOYULS
IRONING MACHINE
Filed Feb. 13, 1922        10 Sheets-Sheet 4

Sept. 4, 1923.

C. H. BOYULS

IRONING MACHINE

Filed Feb. 13, 1922   10 Sheets-Sheet 8

Sept. 4, 1923.

C. H. BOYULS

1,466,693

IRONING MACHINE

Filed Feb. 13, 1922

Patented Sept. 4, 1923.

1,466,693

UNITED STATES PATENT OFFICE.

CECIL H. BOYULS, OF LOUISVILLE, KENTUCKY.

IRONING MACHINE.

Application filed February 13, 1922. Serial No. 536,385.

*To all whom it may concern:*

Be it known that CECIL H. BOYULS, citizen of the United States of America, residing at Louisville, in the county of Jefferson and State of Kentucky, has invented certain new and useful Improvements in Ironing Machines, of which the following is a specification.

This invention relates to ironing machines and has special reference to a machine for ironing the bosoms and bodies of shirts at one and the same time, the machine being of the general type shown in my prior patent for shirt bosom and body machine, granted to me November 2, 1920 and bearing the Number 1357128.

One important object of the present invention is to improve the general construction of the machine shown and described in said prior patent.

A second important object of this invention is to improve the general construction of the shirt ironing machine shown and described in my copending application filed June 25, 1921 and bearing the Serial Number 480377.

I have found by experience that the type of gearing including a worm and worm wheel as shown in said copending application is subject to certain inconveniences as the worm drive causes the motor to over run and consequently to produce, at times too great pressure on the shirt bosom with injury to the latter.

A third object of the present invention is to provide a machine of this class having a form of gearing that will be free from the effects produced by worm gearing and will not cause injury to a shirt being ironed.

I have found in practice that a machine constructed in accordance with my copending application is difficult to construct in such manner as to cause the irons of the machine to press the shirt bosom evenly because of the lack of adjustability of the parts with relation to each other.

A fourth important object of the present invention is to provide means for adjusting the parts relative to each other so that errors in construction may be compensated and the parts caused to coact properly.

I have also found that, due to the compression of the ironing pad in such machines, adjustment is required from time to time even though the parts are assembled in perfect coaptation initially.

A fifth object of this invention is to provide an improved ironing machine construction permitting adjustment of such working parts as require the same from time to time as may be necessary.

The ironing machine of my copending application is so constructed that the operator's end or front of the machine becomes hot and, as the operator comes constantly in contact with this end in adjusting shirts on the machine, the result is unpleasant.

A sixth object of the present invention is to provide an improved construction wherein the operator will be prevented from coming into bodily contact with the hotter parts of the machine.

A seventh important object of the invention is to provide an improved construction wherein a cooling draft of air will be interposed between the operator and the parts of the machine whereon the shirt is positioned for ironing.

The eighth important object of this invention is to improve the means for expanding the shirt on the form or buck so that the shirt will lie smoothly on such form even at the yoke portion.

I have found that the buck or form as constructed in my copending application is subject to unequal heating.

The ninth important object of the invention is to provide an improved construction of such machines having a better distribution of steam so that the buck or form is heated much more evenly.

The tenth important object of this invention is to improve the manner of conducting steam to the irons and especially to improve the swivel joint in such means, the usual steam swivel having been found ineffective and subject to leakage when used in machines of this type.

The eleventh important object of the invention is to provide an improved collar band holder especially adapted for use in connection with such an ironing machine.

With the above and other objects in view, the invention consists in general of certain novel details of construction and combinations of parts hereinafter fully described, illustrated in the accompanying drawings, and specifically claimed.

In the accompanying drawings, like characters of reference indicate like parts in the several views, and:—

Figure 7 is a vertical longitudinal section through the buck.

Figure 8 is a section on the line 8—8 of Figure 7.

Figure 9 is an enlarged detail of one of the rack ends.

Fgure 10 is a section on the line 10—10 of Figure 9.

Figure 11 is an enlarged detail of a portion of the underside of the buck.

Figure 20 is a section through a spring wound drum used herewith, and showing a tail clip or clamp.

Figure 24 is a view of the parts shown in Figure 23 in a second position of adjustment.

Figure 25 is a view showing the manner of adjustably mounting the buck supporting standard on the base so that a tilting movement of the standard and buck may be obtained.

In the embodiment of the invention herein illustrated there is provided a base 10. At each of the front corners of this base is located a standard 11 which is hollow and is provided with an opening 12 in its base and is also open at the top for purposes hereinafter to be described. The base of each standard is provided with an exterior flange 13 and with an interior flange 14. In these flanges are formed openings 15 and bolts 16 of less diameter than these openings pass through them and into the base so that the standard is secured in position thereby. Access to the bolts in the interior is obtained through an opening 17 in the front of the standard, this opening being normally closed by a cover plate 18. In addition to the bolts 16 set screws or distance bolts 19 are provided by means of which the standard may be tiltably adjusted, for instance by screwing down on said bolts 19 on one side the top of the standard is thrown to the other side and by screwing down the front or back bolts the top of the standard is tilted correspondingly backward or forward. It is to be understood that the bolts 16 will be loosened during the adjustment and then retightened when the adjustment has been obtained. While distance bolts 19 have been here shown it is to be understood that these are merely typical of means for accomplishing the tilting adjustment and that other means may be adopted as desired.

Figure 1:
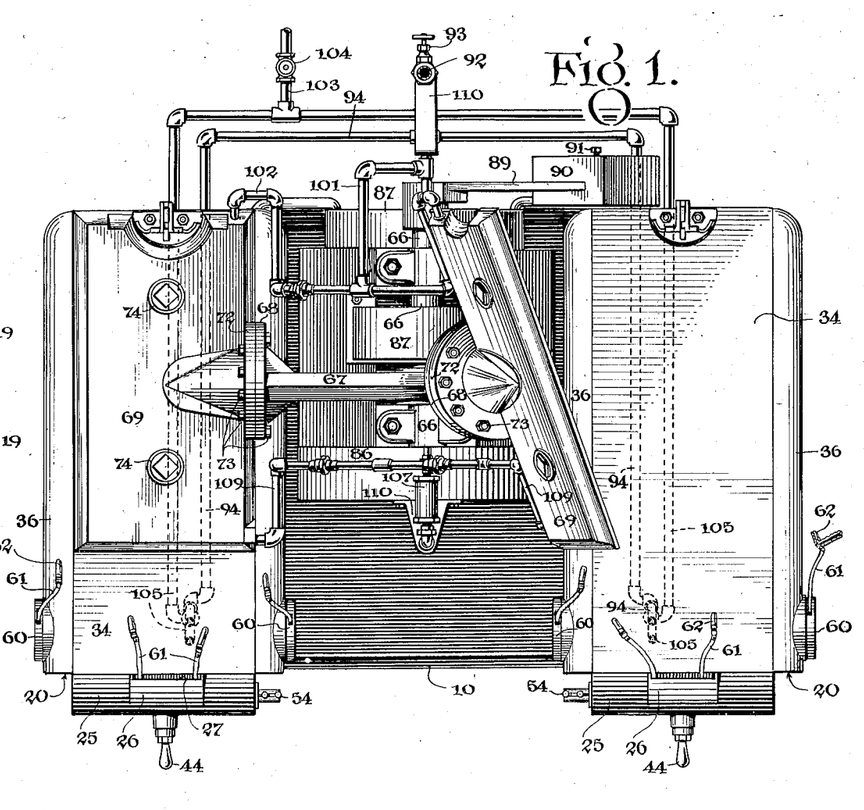
Figure 1 is a plan view of the improved shirt ironing machine.
Figure 2:
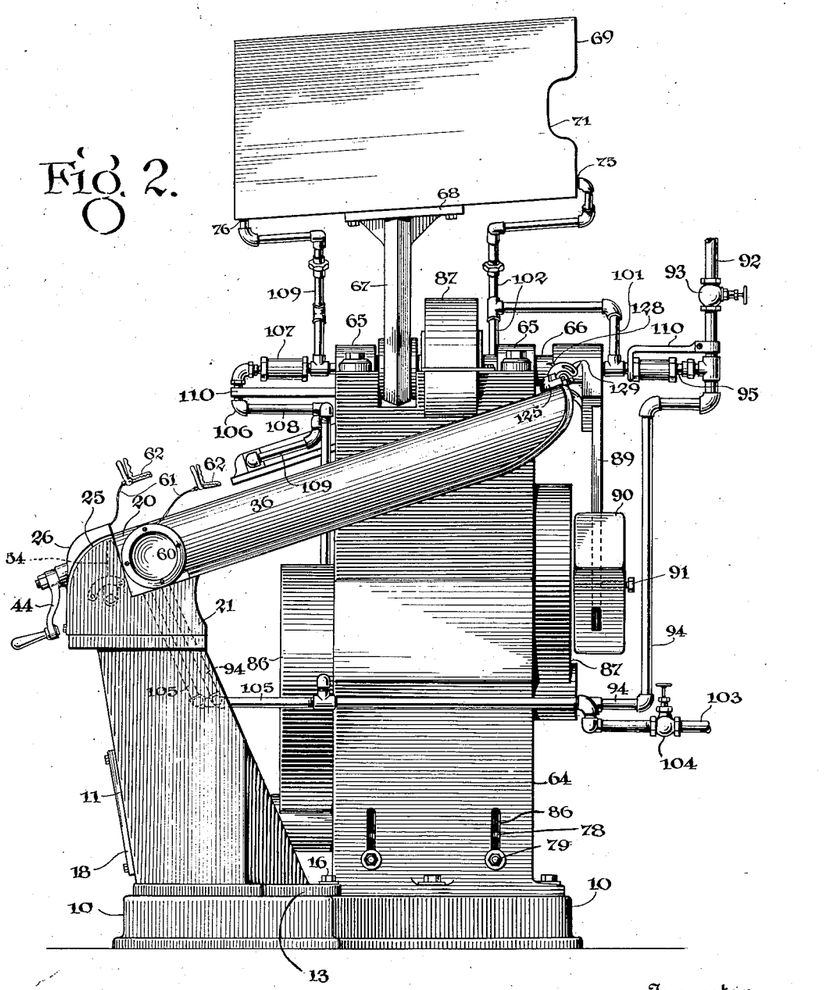
Figure 2 is a side elevation of the machine.
Figure 3:
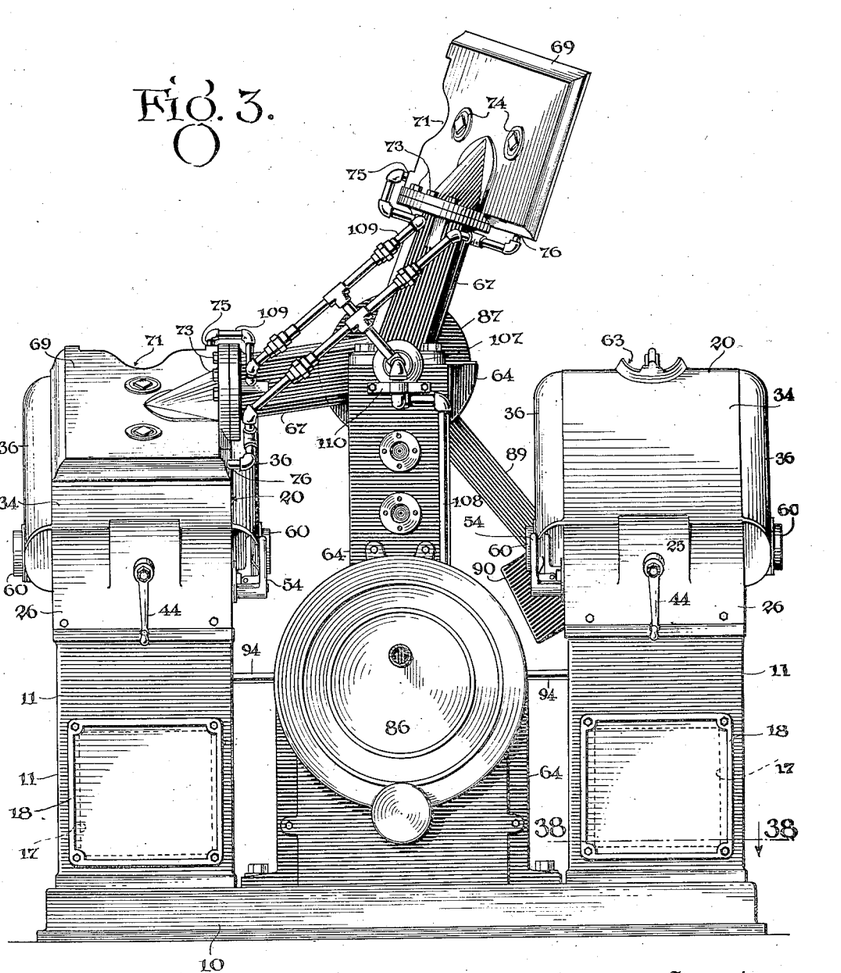
Figure 3 is a front view thereof.
Figure 4:
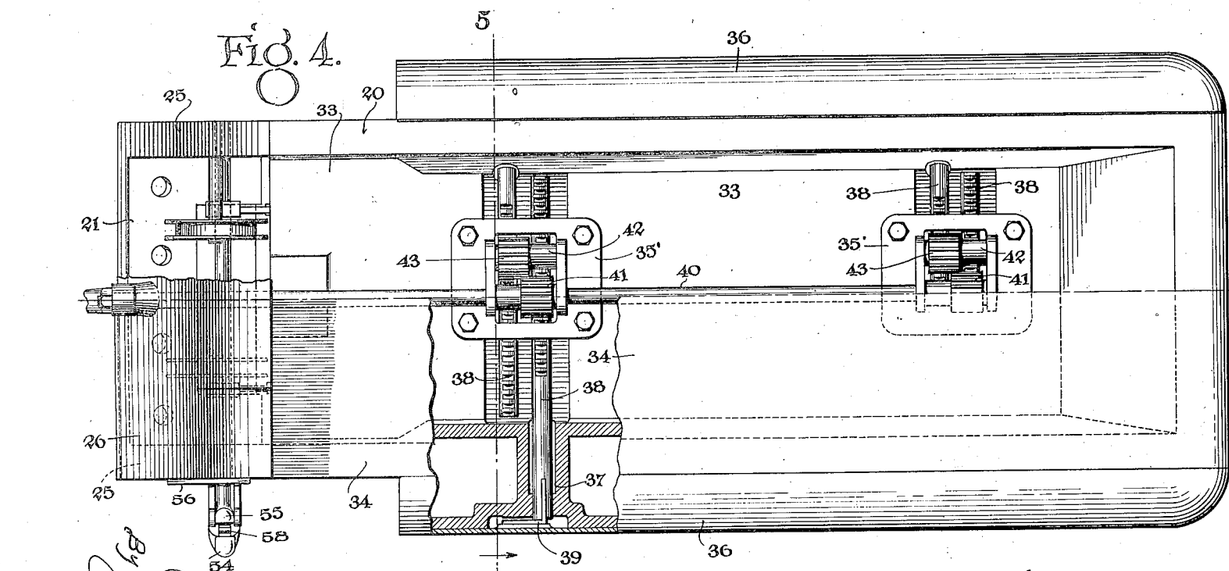
Figure 4 is a face or top view of one of the expanding forms or bucks, one half of the top plate being removed and certain parts being broken away and other parts being shown in section.
Figure 5:
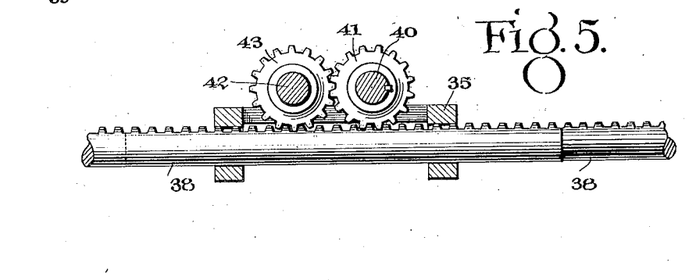
Figure 5 is a detail section on an enlarged scale, the section being taken on the line 5—5 of Figure 4.
Figure 6:
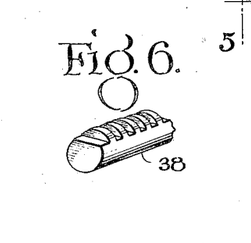
Figure 6 is a detail perspective of a portion of one of the racks used herewith.
Figures 7, 8, 9, 10, 11, 20:
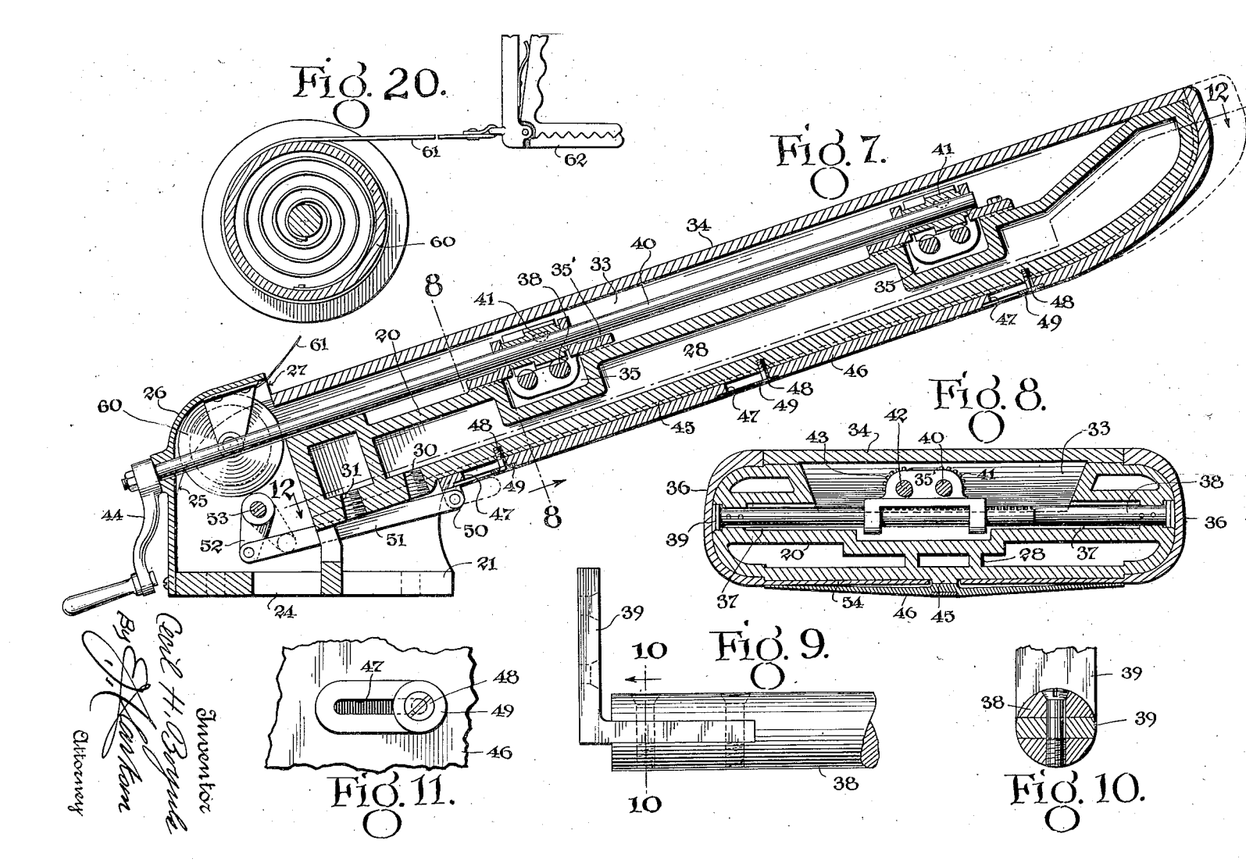
Figure 12:
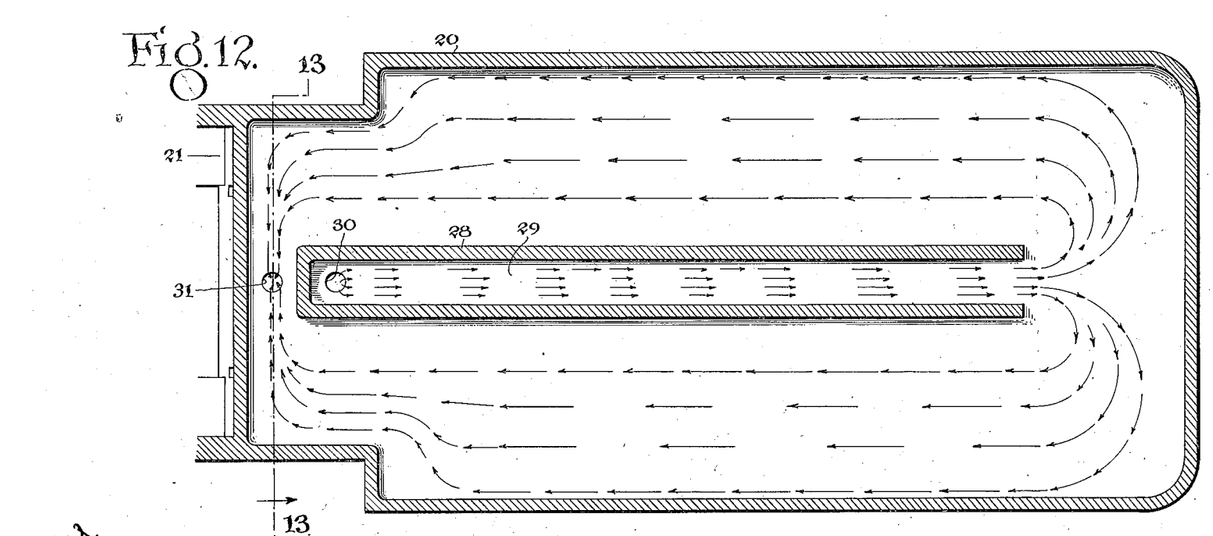
Figure 12 is a section on the line 12—12 of Figure 7.
Figure 13:
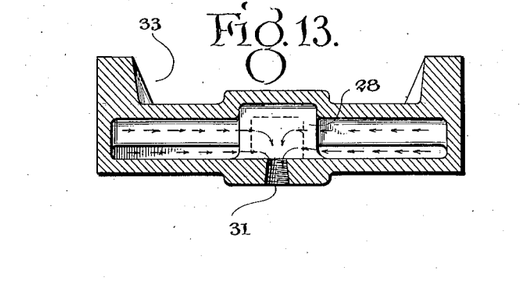
Figure 13 is a section on the line 13—13 of Figure 12.
Figures 14, 15, 16, 17, 18, 19:
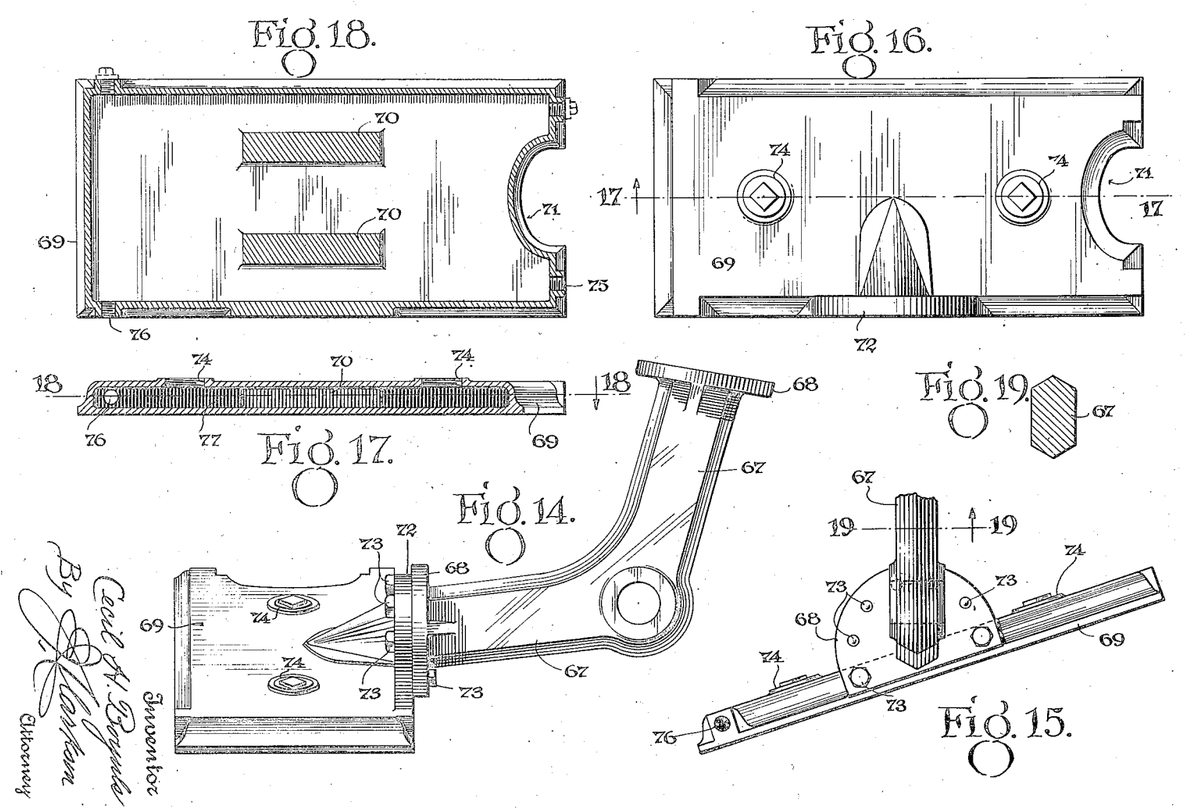
Figure 14 is a front view of a certain V-shaped support for the irons showing one of the latter attached thereto.
Figure 15 is a side view thereof with a portion of the support broken away.
Figure 16 is a plan view of the back of one of the irons.
Figure 17 is a section on the line 17—17 of Figure 16.
Figure 18 is a section on the line 18—18 of Figure 17.
Figure 19 is a cross section of one of the arms of the V-shaped support.

On the top of each of the standards is mounted a shirt form sometimes called a horn or buck. Each of these bucks extend rearwardly and upwardly from the top of its respective standard and are paralleled. Each buck comprises a body portion 20 which is hollow for the reception of steam and is provided at its forward end with a base 21 called the buck base. In the buck base are formed openings 22 wherethrough pass bolts 23 of less diameter than the openings 22 and are screwed into the top of the standard 11. The rear of this base is open so that access may be had to said bolts and by means of the loose fit of said bolts adjustment of the buck longitudinally, laterally or through a horizontal angle may be effected to a sufficient degree for the purposes of this machine. The base 21 is provided with a ventilating opening 24. It is to be noted that this buck base is provided with side walls which extend slightly above the top of the buck body and have arcuately curved front and top edges 25. Fitted on these curved edges is a hood 26 which has its central portion elevated to provide a vent opening 27 so that air rising up the standard 11 will pass out the opening 27 forwardly over the rear end of the buck. As the operator leans over the front end of the buck when adjusting a garment thereon the hood will prevent bodily contact with the hot rear end of the buck while the current of air rising through the hood by the warming action of the hot buck will be only heated slightly so that the hood will not become unduly heated. The buck is heated in an improved manner so that the heating effect in its action on the shirt is distributed in a substantially uniform manner. To this end the hollow body of the buck is interiorly divided by a partition wall U shaped in plan as shown best in Figure 12 at 28. By means of this partition wall there is provided a longitudinally extending centrally disposed inlet passage 29 with a closed end adjacent the front of the buck and an open end adjacent the rear. At the closed end of this inlet passage there is provided an inlet 30 whereto the steam piping is connected as later described. Between the closed end of the inlet passage and the front wall of the buck is an outlet port 31 for the connection of the exhaust piping. Thus the live steam enters the port 30 and passes centrally to the rear end of the buck through the inlet passage 29, returning to the exhaust port 31 through lateral chambers 32, all as shown by the arrows in Figures 12 and 13. By this means the steam as it enters the body is jacketed laterally by the steam about to leave the body thus cornering the heat. Also the entering steam gives up some of its heat units to the steam in the lateral chambers so that the heat is nearly uniform in all parts of the body of the buck. In the top of the buck is a recess or hollow 33 which is normally closed by a cover plate 34 thus forming an air chamber. The bottom of this air chamber is channelled as at 35' and covering a portion of each channel adjacent the center of its length is a bearing casting 35. The sides of the buck body are rounded and on these rounded sides are fitted the lateral expansion members or wings 36, which fit closely against the body so that, when closed against said body the wings receive heat therefrom, this heat being stored in the wings and given up to the shirt when the latter is expanded upon the form. Extending from the recess 33 are tubular portions 37 affording passage for rack bars 38 circular in cross section. The outer end of each rack bar is bifurcated to receive one leg of an angle bracket 39, the other leg of said bracket being secured to the inside of the respective wing. Extending longitudinally through each buck is an operating shaft 40 which is journalled in the bearing castings 35 and carries gear wheels 41 meshing with the racks which are attached to one of the wings. Mounted in the bearing castings are short shafts 42 carrying gears 43. These gears mesh with the remaining racks and also partially overlap the gears 41 so that the edges of the gears 41 and 43 are in mesh. On the shaft 40 is an operating crank 44. When this operating crank is turned in one direction the wings will be moved away from the body while when the crank is turned in the opposite direction the wings will move inward to lie against the body and receive heat therefrom. Extending longitudinally beneath the body is a rib 45 and on this rib is mounted a plate 46 tapering from the center to its side edges. This plate is provided with a series of elongated openings 47 having recessed outer ends so that screws 48 may extend through said openings and be provided with washers 49 fitting in the recess. By means of these openings and screws the plate 46 is permitted to move longitudinally of the buck and in order to accomplish this movement there is provided on this plate a lug 50 at its forward end to which is pivoted the rear end of a link 51. The front end of this link is connected to a rock arm 52 fixed on a rock shaft 53 extending from side to side of the buck base beneath the hood. On one end of this rock shaft is carried a crank handle 54 to which is pivoted at latch member 55 working over a segment plate 56 provided with suitable openings 57 with which the latch member may engage to hold the crank handle in suitably adjusted position. A spring 58 serves to normally hold the latch in engagement with the segment plate. The rear end of the plate 46 is curved to conform to shape of the buck body and this portion of the plate serves to expand the yoke of the shirt, being movable between the full and dotted line position of Figure 7 for this purpose. It is to be noted that the rib 45 serves to space the lateral portions of the plate 46 from the under side of the body of the buck and in the spaces thus formed slide the extensions 54 of the wings. This construction enables these extensions to contact with the buck body and be thoroughly heated thereby. On the front part of the wings and under the hood are spring wound drums 60 carrying cables 61 to which are attached tail clips 62. The cables from the drums within the hood lead to the vent opening 27 and these clips are for the purpose of connection to the tail portions of a shirt to hold the shirt smoothly on the buck ready for the application of the iron. At the upper rear end of each buck is a collar band holder 63 which is shown in Figures 33 to 37 in detail.

Figure 21:
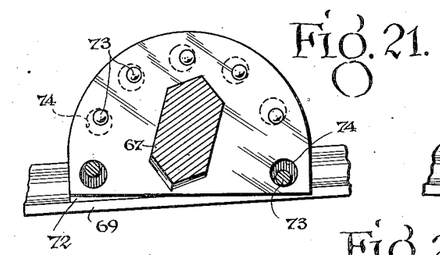
Figure 21 is a view of a portion of one of the irons and of one arm of the support showing the manner in which they are adjustably connected, the parts being shown in one extreme position of adjustment.
Figure 22:
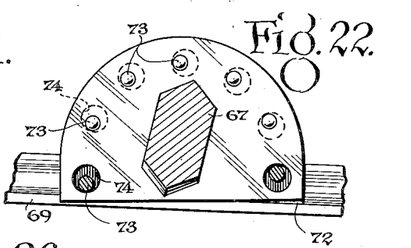
Figure 22 is a view similar to Figure 21 but showing the parts in the other extreme of adjustment.
Figure 23:
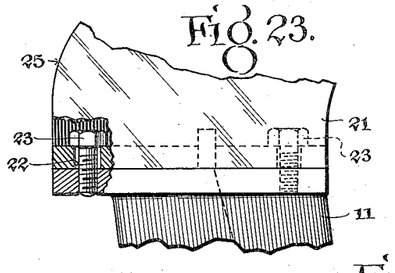
Figure 23 is a view showing the manner of adjustably mounting one of the bucks or forms on its standard, the parts being in one position of adjustment.
Figure 26:
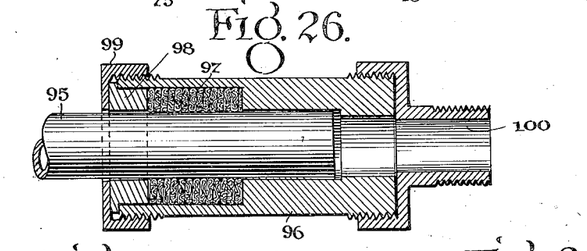
Figure 26 is a longitudinal section through one of the steam swivel joints used herewith.
Figure 27:
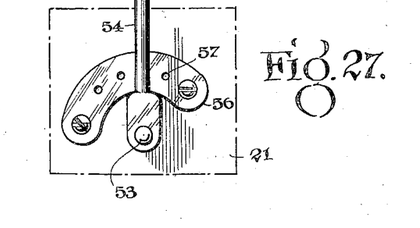
Figure 27 is an enlarged elevation, taken sidewise of the machine, of a certain latch lever and segment used herewith.
Figure 28:
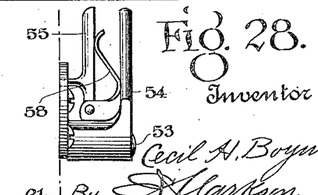
Figure 28 is a view of the parts shown in Figure 27 from the front of the machine.
Figures 29, 30, 31:
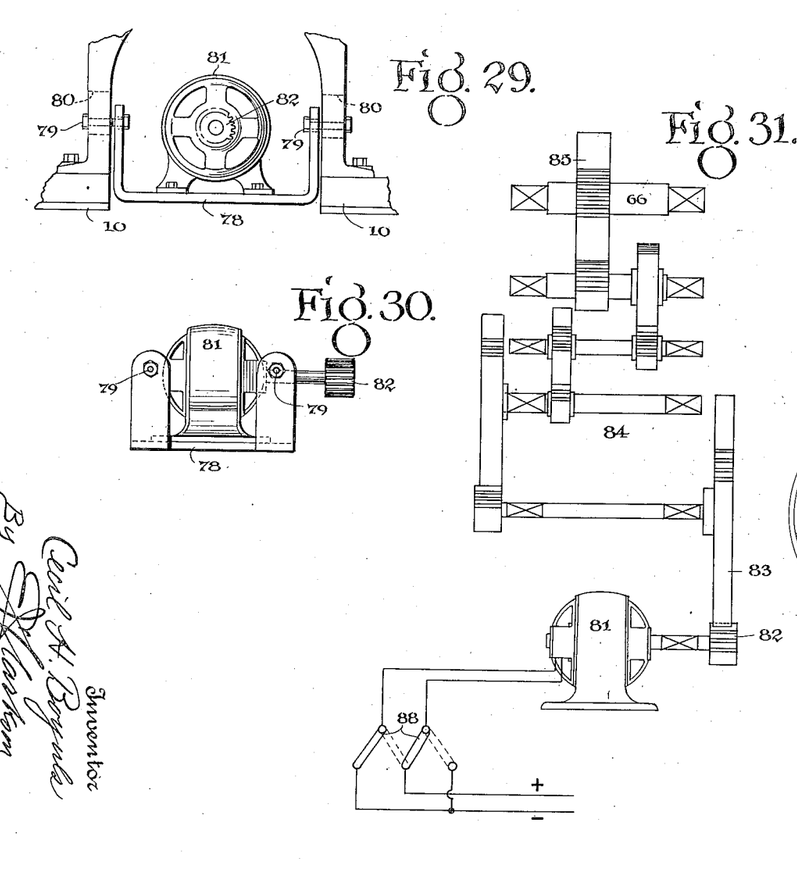
Figure 29 is a front view of the motor of the machine and its cradle, a part of the machine frame and base being also shown.
Figure 30 is a view of the cradle and motor from the side.
Figure 31 is a diagrammatic side view of the gear train.
Figure 32:
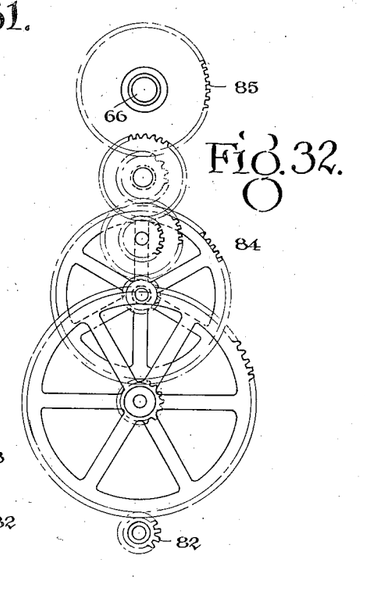
Figure 32 is a similar rear view of such gear train.

Mounted centrally on the rear portion of the base 10 is a housing 64 and on the upper part of this housing are bearings 65 which support a shaft 66 preferably termed the iron shaft. On the shaft 66 is mounted a V-shaped iron support 67 having two heavy rigid arms. On each of these arms at its end is an iron attaching flange 68. Each iron itself consists of a shallow hollow body 69 with a flat polished under surface. The top and bottom walls of this iron are supported in spaced position by ribs 70 and the iron is cut away at its rear and as shown at 71 to accommodate the collar band holder. On one side of the iron body is provided a flange 72 for connection of the iron to the flange 68. These two parts are held together by bolts 73 which pass through enlarged openings 74 in one flange and are screwed into the other. This arrangement is especially shown in Figures 21 and 22 wherein the extreme variation in angular relations of the iron and its support are clearly seen. In devices of this character it is essential that the iron should press on the bosom of the shirt evenly throughout and it is for the purpose of permitting the nicety of coordination necessary to accomplish this that the various adjustments are used. If the iron presses harder on one side of the buck than on the other this may be corrected by tilting the standard sideways; if it presses harder to the front or rear this may be corrected by the adjustment of the iron on the support, by tilting the standard forwardly or backwardly or by combining both of these; if the pressure is insufficient or too little the buck may be adjusted rearwardly or forwardly and if the center lines of the buck and iron are at an angle to each other in a plane parallel to the face or top of the buck the latter may be swivelled on its standard. Thus any and all errors in coaptation of the iron and buck may be removed. In order to provide steam for the iron inlet and outlet ports 75 and 76 are formed in the side walls so that the steam and exhaust piping to be described later may be connected thereto. In connection with the showing of this iron plugged core holes may also be seen.

Within the housing 64 is located a U-shaped cradle 78. This cradle is adjustably supported within the housing by means of bolts 79 passing through vertically elongated slots 80 in the side walls of the housing. On this cradle is mounted the motor 81 which carries on its shaft a spur drive pinion 82. By means of the bolts and slots adjustment of the motor vertically may be had so that this drive pinion may be brought properly into mesh with the spur gear 82 of a reducing spur gear train 84 having its terminal gear 85 located on the iron shaft 66. Access to the motor is had through an opening in the housing normally closed by a cover plate 86 and other cover plates 87 afford means whereby access may be had to other parts of the gear train. The motor 81 is of the reversing type and is connected to a reversing switch shown diagrammatically at 88. This switch is of any ordinary construction capable of being moved by the operator's foot and in consequence is not shown in detail nor elsewhere in the drawings.

On the shaft 66 is fixed a balance arm 89 whereon is slidably mounted a balance weight 90 held in adjusted position on said arm by a set screw 91 so that the weight of the irons can thus be counter balanced.

The steam for the bucks and irons is supplied through a main steam pipe 92 provided with a valve 93. This pipe extends down to branches 94 which lead to the respective ports 30. Another branch 95 of this pipe connects to a pipe swivel 96 which has a body recessed to receive packing 97 held in position by a gland 98 forced inward by a gland nut 99. On the end of this swivel is a nipple 100 to which is connected a pipe 101 branched at 102 to lead to the inlet ports 75 of the respective irons. Similarly there is provided a main exhaust pipe 103 controlled by a valve 104. This pipe is provided with branches 105 leading to the exhaust ports of the bucks and with a branch 106 leading to a swivel 107. From the swivel extends a pipe 108 which is provided with branches 109 leading to the iron exhaust ports 76. It is to be noted that the swivels are axially alined with the shaft 66 and that straps 110 hold these swivels from accidentally blowing apart.

The collar band holder preferably used herewith is provided with a base member adjustably mounted on the iron top 34 by bolts 112 the heads of which fit loosely in recesses 113 in said top 34. The front of this base is arcuate and on this front and along the sides the base is rabetted to receive a sliding inner grip or jaw 114 having an arcuate and bevelled face. Extending rearwardly from the central portion of the jaw is a tongue 115 which passes between lugs 116 extending upwardly from the base. The end of this tongue is provided with a stop lug 117 to limit the forward movement of said jaw and the latter is urged forward by a spring 118. Through the lugs 116 extends a pivot bolt 119 on which is pivoted a locking member 120 of general triangular shape, the member being pivoted at one angle and having a cross pin 121 extending through a second angle. This cross pin enters arcuate slots 122 formed in the arms 123 of a movable pin carrier body 124. This jaw 125 is bevelled on its inner side to conform to the bevel of the sliding jaw 114. This body 124 is provided with a rearwardly extending lug 126 engaged in notches 127 formed in the base lugs 116. On the body 124 is a finger grip 128 and on the member 120 is also a finger grip 129.

The operation of this collar band holder is as follows:—

Figures 33, 34, 36, 37:
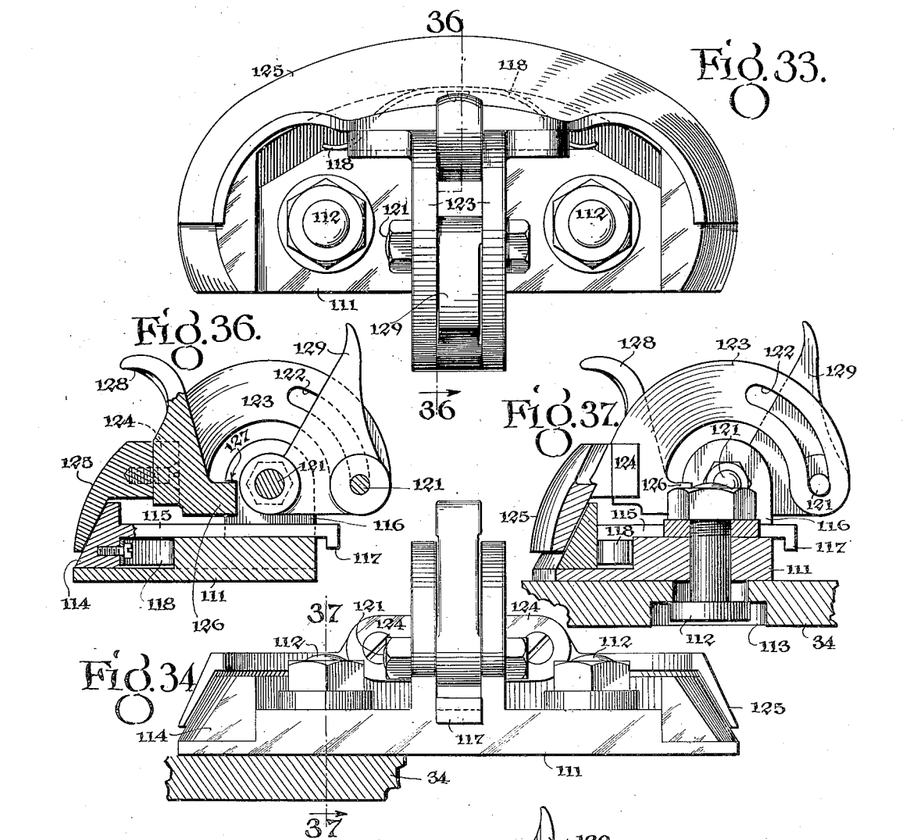
Figure 33 is a plan view of the collar band holder.
Figure 34 is a rear view thereof.
Figure 36 is a section on the line 36—36 of Figure 33.
Figure 37 is a section through the collar band holder on the line 37—37 of Figure 34 and showing a portion of the buck also in section.
Figure 35:
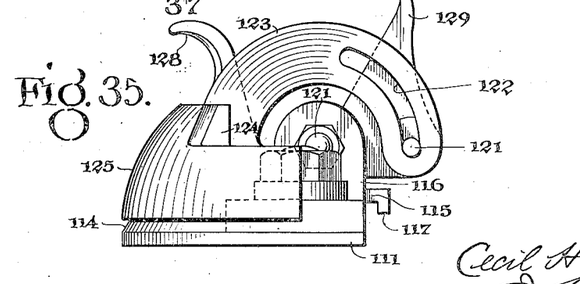
Figure 35 is a side view of said collar band holder.
Figure 38:
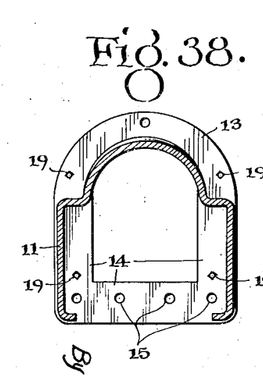
Figure 38 is a section on the line 38—38 of Figure 3.

Assuming the parts to be in position shown in Figure 36 it is first necessary to pull the finger grip 129 forward. This causes the pin 121 to travel upwardly and forwardly along the slots 122 until it reaches the front ends thereof. Then further movement of the member 129 will release the lug 126 from the notches 127 so that the swinging jaw may be raised. After the collar band is positioned around the device with its first portion resting on the face of the sliding jaw the movable jaw is swung down. Finally the locking member is turned back which engages the lug in its notches and consequently holds the collar band firmly between the sliding and swinging jaws.

In the operation of the device as a whole a shirt is adjusted on one of the bucks, the iron cooperating therewith being raised at the time. The collar band is secured in the collar band holder and the shirt smoothed down on the buck. The tail clamps are then applied and the operator steps on the switch to bring the iron down on the bosom of the shirt. When the iron is in position the expanding cranks are operated to stretch the shirt on the buck. The operator then steps over to the other buck and repeats the process after which she returns to the first buck and removes the shirt which will be found properly ironed. By moving from side to side in this manner great rapidity of ironing is effected.

There has thus been provided a simple and efficient device of the kind described and for the purposes specified.

It is obvious that minor changes may be made in the form and construction of the invention without departing from the material principles thereof. It is not therefore desired to confine the invention to the exact form herein shown and described, but it is wished to include all such as properly come within the scope claimed.

Having thus described the invention, what is claimed as new, is:—

1. In an ironing machine, a base, a pair of standards supported on said base, an ironing buck carried by each standard a housing mounted on said base centrally of the lateral distance between the standards, an iron shaft journalled at the top of said housing, a pair of irons carried by the iron shaft and arranged to cooperate with respective bucks, speed reducing gearing including a terminal gear on said iron shaft, all of the gears of said gearing being spur gears, and a reversible electric motor mounted in said housing and geared to said reducing gearing.

2. In an ironing machine, a base, a pair of standards supported on said base, an ironing buck carried by each standard, a housing mounted on said base centrally of the lateral distance between the standards, an iron shaft journalled at the top of said housing, a pair of irons carried by the iron shaft and arranged to cooperate with respective bucks, reducing gearing including a terminal gear on said iron shaft, a vertically movable cradle mounted within the housing, means to hold said cradle in vertically adjusted position, and a motor mounted on said cradle and having operative connection to the reducing gear.

3. In an ironing machine, a base, a pair of standards supported on said base, a buck supported on each standard and arranged for expansion in two directions, means for expanding each buck in one direction, means for expanding the buck in the other direction operable independently of the first mentioned expanding means, irons supported for movement to and from cooperative relation with the respective bucks, and means to move one of the irons toward its buck and the other away from its buck in synchronism.

4. In an ironing machine, a base, a standard supported on said base, adjusting means connecting the standard and base and arranged to effect tilting of the standard with respect to the base, means to rigidly secure said standard in tilted position, a buck mounted on the said standard, and an iron supported from said base and movable toward and from the buck.

5. In an ironing machine, a base, a standard supported on said base, adjusting means connecting the standard and base and arranged to effect tilting of the standard longitudinally and transversely of said base, means to rigidly secure said standard in tilted position, a buck mounted on the standard, and an iron supported to move to and from the buck.

6. In an ironing machine, a base, a standard supported on said base, adjusting means connecting the standard and base and arranged to effect tilting of the standard longitudinally and transversely of said base, a buck mounted on the standard, means to connect the buck and standard and arranged to permit slight rotative movement of the buck about the vertical axis of the standard, and an iron supported to move to and from the buck.

7. In an ironing machine, a base, a standard supported on said base, adjusting means connecting the standard and base and arranged to effect longitudinal and transverse tilting movement of said standard with respect to the base, a buck mounted at one end on top of said standard, means to connect the buck and standard and arranged to permit rotative adjustment of said standard about a vertical axis, an oscillatory shaft supported from the base adjacent the standard, an arm carried by said shaft, an iron carried by the arm, and means for connecting the iron and arm arranged to permit swivelling adjustment of said arm with respect to the buck.

8. In an ironing machine, a base, a standard supported on said base, adjusting means connecting the standard and base and arranged to effect longitudinal and transverse tilting movement of said standard with respect to the base, a buck mounted at one end on top of said standard, means to connect the buck and standard and arranged to permit rotative adjustment of said standard about a vertical axis, said means being also arranged to permit adjustment of said buck bodily in a horizontal plane, an oscillatory shaft supported from the base adjacent the standard, an arm carried by said shaft, an iron carried by the arm, means for connecting the iron and arm arranged to permit swivelling adjustment of said iron with respect to the buck, and a swiveling steam pipe connected to the iron to supply steam thereto.

9. In an ironing machine, a buck, means for supporting said buck, and a plate fixed to said supporting means and extending rearwardly over the top of the buck at the front thereof whereby to lie between the buck and the position occupied by the operator, said plate being arranged to prevent contact of the operator's body with said buck, said plate being spaced from the means for supporting the buck at the front to permit entry of air between the plate and said means.

10. In an ironing machine, a buck, means to support said buck with one portion adjacent an operator's position, and means associated with the buck to direct a current of cool air along said buck away from the operator.

11. In an ironing machine, a buck having a base portion at one end including a bottom wall and lateral walls, and a hood carried by said walls to enclose the space between them whereby to form an air chamber at said end of the buck, said air chamber having an air inlet and an air outlet, the latter being positioned to direct air rearwardly over the buck.

12. In an ironing machine, a buck having a base portion at one end including a bottom wall having an air inlet opening and lateral walls having edges curved upwardly and rearwardly from said bottom wall, and a hood secured to the wall edges and having its rear edges positioned above the plane of the body of the buck whereby air rising through the hood will be directed rearwardly over the upper surface of the buck body.

13. In an ironing machine, a buck, means for expanding the buck longitudinally, and other means for expanding the buck transversely, said means being independently operable.

14. In an ironing machine, a buck having a body portion, lateral wings adapted to fit the lateral portions of the buck body, means to simultaneously move said wings away from the body in opposite directions, an expansion member adapted to fit one end of the body, and other means for moving the expansion member longitudinally to and from the buck body.

15. In an ironing machine, a buck having a body, a plate mounted beneath said body and arranged to slide longitudinally of the body, a yoke stretching member carried by the rear end of the plate and shaped to fit the rear end of the body, and means at the front of the body for moving said plate longitudinally.

16. In an ironing machine, a buck having a body, a plate mounted beneath said body and arranged to slide longitudinally of the body, a yoke stretching member carried by the rear end of the plate and shaped to fit the rear end of the body, means at front of the body for moving said plate longitudinally, lateral wings adapted to fit the lateral portions of the body and having extensions beneath the body slidable between the lateral portions of the plate and said body, and means for simultaneously expanding said wings.

17. In an ironing machine, a buck having a body provided on its under side with a centrally disposed longitudinally extending rib, a plate beneath said body and having centrally disposed longitudinally extending slots, screws extending through the slots into rib whereby to permit movement longitudinally of said plate a yoke stretching member carried by the rear end of the plate and shaped to fit the rear end of the body, a rock shaft at the front of said body, a rock arm carried by said shaft, a link connecting the rock arm and the front end of the plate, and a latch lever connected to the rock shaft to actuate the same.

18. In an ironing machine, a buck having a body provided on its side with a centrally disposed longitudinally extending rib, a plate beneath said body and having centrally disposed longitudinally extending slots, screws extending through the slots into said rib whereby to permit movement longitudinally of said plate, a yoke stretching member carried by the rear end of the body, a rock shaft at the front of said body, a rock arm carried by said shaft, a link connecting the rock arm and the front end of the plate, a latch lever connected to the rock shaft to actuate the same, lateral wings adapted to fit the lateral portions of the body and having extensions beneath the body slidable between the lateral portions of the plate and said body, and means for simultaneously expanding said wings.

19. In an ironing machine, a steam heated buck having a hollow body forming a steam chamber, said chamber having an inlet port and an outlet port, and partitions in said chamber arranged to direct the steam flowing therethrough in a circuitous path, said partitions being further arranged to cause the steam flowing toward the outlet port to act as a jacket for the steam adjacent the inlet port.

20. In an ironing machine, a steam heated buck having a hollow body forming a steam chamber, said chamber having an inlet port and an outlet port, and partitions in said chamber arranged to direct the steam flowing therethrough in a circuitous path, said partitions being further arranged to cause the steam flowing toward the outlet port, said path leading to act as a jacket for the steam adjacent the inlet port away from one end of the body and then back toward the same end, said inlet and outlet ports being located close together at the same end.

21. In an ironing machine, a steam heated buck having a hollow body forming a steam chamber, partitions extending longitudinally of the chamber between the top and bottom walls thereof, a transverse partition connecting the front ends of said partitions, said partitions together forming a steam inlet passage closed at the front and open at the rear and extending longitudinally of the center of the body, said body having a steam inlet port opening into the passage at its front end and having a steam outlet port positioned immediately in front of the transverse partition.

In testimony whereof I affix my signature.

CECIL H. BOYULS.